United States Patent [19]

Richter et al.

[11] 4,453,855
[45] Jun. 12, 1984

[54] CORNER CONSTRUCTION FOR SPACER USED IN MULTI-PANE WINDOWS

[75] Inventors: David J. Richter, Kankakee; Clarence W. Miller, Bourbonnais, both of Ill.

[73] Assignee: Thermetic Glass, Inc., Peoria, Ill.

[21] Appl. No.: 289,189

[22] Filed: Aug. 3, 1981

[51] Int. Cl.$^3$ .............................................. E04C 2/38
[52] U.S. Cl. ..................................... 403/295; 52/202; 52/656; 403/402
[58] Field of Search ............... 52/172, 397, 398, 399, 52/656, 788, 202; 403/293, 295, 305, 402; 428/34

[56] References Cited

U.S. PATENT DOCUMENTS

| | | | |
|---|---|---|---|
| 2,451,076 | 10/1948 | Edwards, Jr. ................. | 403/295 |
| 2,714,944 | 8/1955 | Bongiovanni ................. | 403/295 |
| 2,918,153 | 12/1959 | Hammitt et al. ............. | 403/295 |
| 3,099,051 | 7/1963 | Chenoweth ................... | 403/402 |
| 3,226,903 | 1/1966 | Lillethun ..................... | 52/172 |
| 3,294,429 | 12/1966 | Halip ........................... | 403/295 |
| 3,342,514 | 9/1967 | Ivanhoe et al. .............. | 403/295 |
| 3,579,724 | 5/1971 | Toth ............................. | 52/656 X |
| 3,627,359 | 12/1971 | Paul ............................. | 52/656 X |
| 3,709,533 | 1/1973 | Walters ........................ | 403/295 X |
| 3,786,612 | 1/1974 | Baker ........................... | 403/295 |
| 3,797,194 | 3/1974 | Ekstein ........................ | 52/656 X |
| 3,866,380 | 2/1975 | Benson ........................ | 52/656 |
| 4,071,301 | 1/1978 | Pritchard ..................... | 403/295 X |
| 4,080,482 | 3/1978 | Lacombe ..................... | 52/172 X |
| 4,097,320 | 6/1978 | Brauer et al. ................ | 52/788 X |
| 4,183,693 | 1/1980 | Berdan ........................ | 403/295 |
| 4,222,209 | 9/1980 | Peterson ...................... | 52/172 |
| 4,296,587 | 10/1981 | Berdan ........................ | 52/656 X |

FOREIGN PATENT DOCUMENTS

| | | | |
|---|---|---|---|
| 629532 | 1/1963 | Belgium ....................... | 52/656 |
| 2231045 | 2/1973 | Fed. Rep. of Germany .. | 403/402 |
| 2623752 | 12/1976 | Fed. Rep. of Germany .. | 403/295 |
| 901029 | 7/1962 | United Kingdom .......... | 403/402 |
| 2064053A | 6/1981 | United Kingdom .......... | 403/402 |

Primary Examiner—Alfred C. Perham
Attorney, Agent, or Firm—David J. Richter

[57] ABSTRACT

A multiple-pane, hermetically-sealed, thermal-resistant window unit is disclosed having a spacer between adjacent panes for maintaining separation between the panes, wherein the corners of the spacer are rigidified and locked by a corner insert which prevents separation of adjacent spacer frame members and wherein the spacer frame members are attached to the window frame to prevent and/or reduce movement of the spacer frame members. The seal around the cavity between adjacent panes is completed after the temperature of the window components and the cavity air is about equal to the temperature of the ambient air. A resistance heating wire is applied to the outside surface of the spacer frame intermediate the adjacent panes of glass. A method of forming on-site retro-fit multiple-pane windows utilizing the existing window pane wherein a spacer and an additional pane are installed and adhered to the original pane through the application of heat and the final sealing of the cavity formed is accomplished after the window components have cooled down.

1 Claim, 10 Drawing Figures

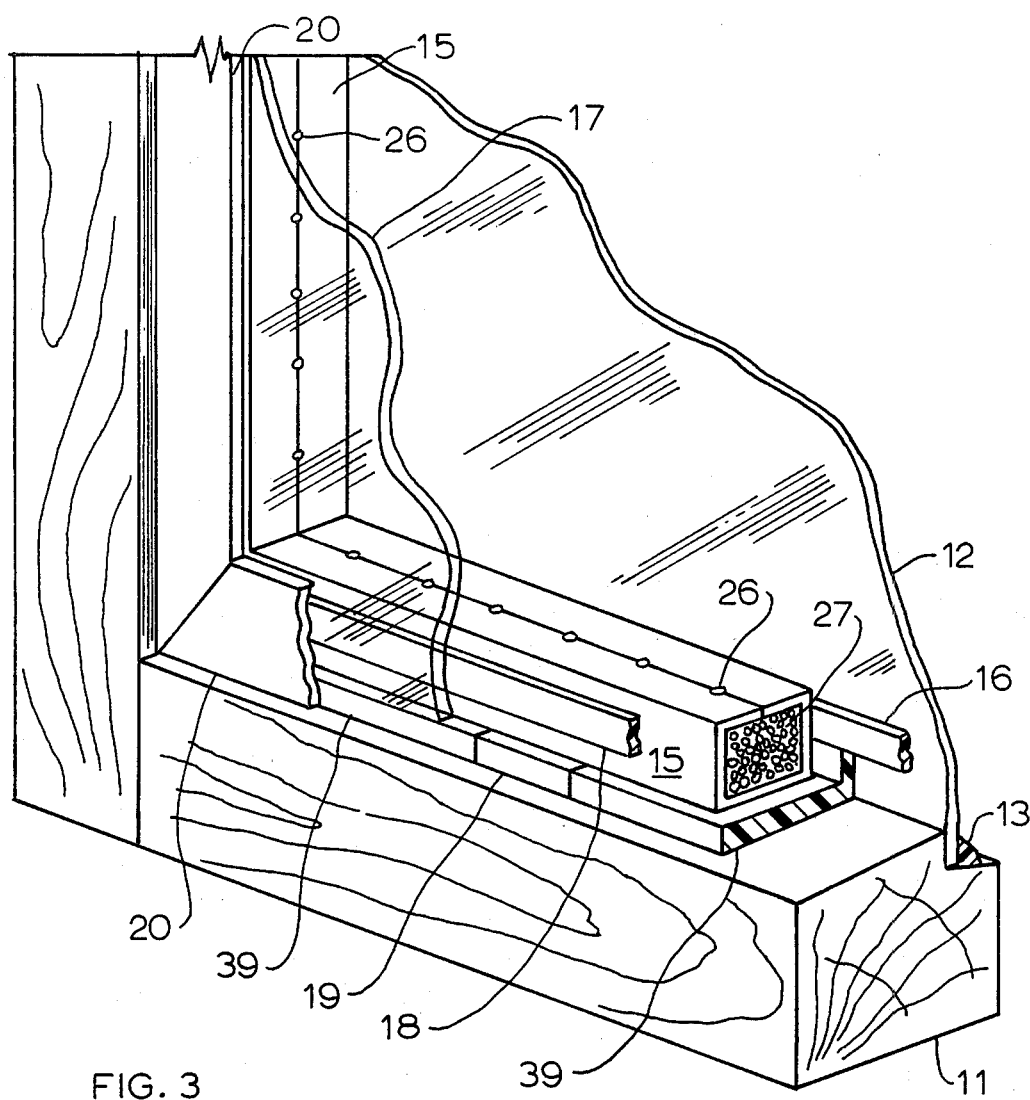
FIG. 3
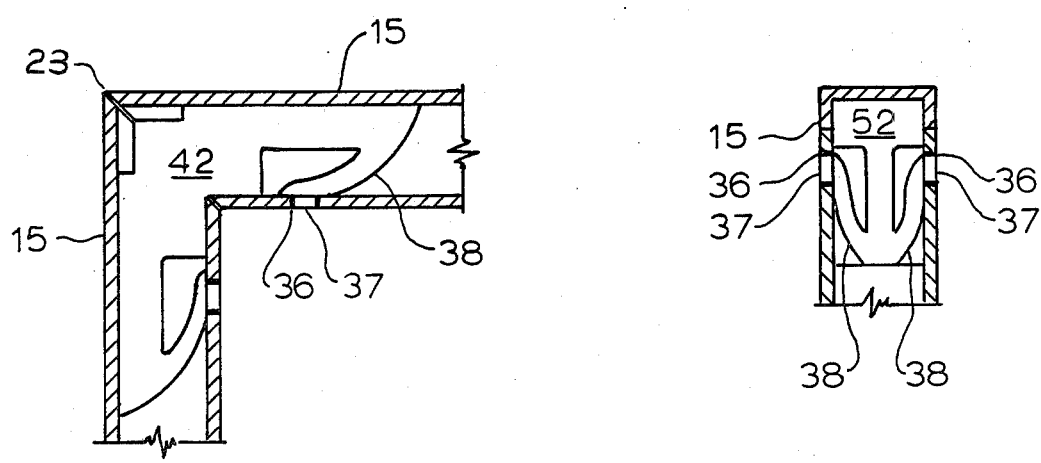
FIG. 8
FIG. 9

CORNER CONSTRUCTION FOR SPACER USED IN MULTI-PANE WINDOWS

BACKGROUND OF THE INVENTION

This invention relates generally to multiple-pane windows wherein the panes are separated by a spacer frame and the cavity between the panes is hermetically sealed. More particularly, it concerns a corner key which is inserted in the ends of adjacent spacer frame members and the corner key is locked into engagement with the spacer frame members. In addition, it concerns attaching the spacer frame members to the window frame in several spaced locations around the periphery of the spacer frame. Also, it concerns sealing the cavity between the panes after the spacer frame and additional pane are adhered to the original pane and the window components and cavity are at a temperature substantially equivalent to the ambient temperature, and adding a second seal around the periphery of the spacer frame.

Hermetically-sealed, multiple-pane windows have been available for some time but until recently only as factory made units. Previously, hermetically-sealed units were completed in a factory by preparing a sandwich of pane-spacer frame-pane and sealing the sandwich in an oven large enough to accomodate the entire assembly. The sealant applied to the joints of the sandwich is softened or activated in the oven and the seal is completed while the sandwich is at an elevated temperature.

More recently, methods and components have emerged for making sealed multiple-pane windows on site by adding a spacer frame and an additional pane to an original single pane window and sealing the interfaces between the spacer frame and the panes or the space between the separated panes. The advantage of making sealed windows on site is that the original pane can be utilized; thereby eliminating the cost of one of the panes, removal of the original pane from the window frame and extensive window frame modifications which otherwise would be required to accomodate the additional thickness of the factory made unit. Of course the sealed multiple-pane window provides greater thermal resistance to retard heat transfer through the window. Thus less heat escapes through the window in the winter time and less heat is gained through the window in the summer time, with the overall result of using less energy to heat and cool a building.

The known methods and components for forming sealed multiple-pane windows on site have shortcomings in that the seal on the unit is formed while the window components and cavity air are at an elevated temperature, thereby creating a partial vacuum in the cavity when the unit cools down. The seal may be created at approximately 200° F. and the window subsequently sees an average temperature of 60° F. or low temperatures below zero. The partial vacuum creates inwardly directed forces on the spacer frame, the panes and the sealant. The inwardly directed forces can cause a seal to rupture, thereby allowing ambient air and its attendant moisture or water vapor to enter the cavity, or bow a spacer frame member inwardly at points between corners of the spacer frame, thereby spreading sealant across the interior surface of the panes and creating gaps or separations between the adjacent spacer frame members at the interface between adjacent spacer frame members. The known components and methods for forming sealed multiple-pane windows on site do not provide for locking adjacent spacer frame members together at their interface. Gaps formed between spacer frame members after the seal is formed can provide leaks in the seal and can give the appearance of a lower quality unit

SUMMARY OF THE INVENTION

It is an object of the invention to provide a rigidified spacer frame for a sealed multiple pane window formed on site. It is a particular object of this invention to provide a spacer frame for a sealed multiple-pane window wherein the corners cannot separate.

It is another object of this invention to provide an attachment between the window frame and the spacer frame members at locations intermediate the ends of the spacer frame members.

Another object of this invention is to provide a sealed, multiple-pane window wherein the atmosphere sealed between the panes, within the cavity, is substantially the same as the atmosphere outside the panes at the time of installation on site.

It is also an object of this invention to provide a method of installing sealed multiple-pane windows on site utilizing the existing window panes.

In accordance with the present invention, there is provided a novel corner construction for joining adjacent tubular frame members for a spacer frame comprising two tubular frame members arranged to form the desired spacer frame corner profile with one end of one frame member being adjacent to one end of the other frame member, and a corner key having two legs wherein one leg is located within the end portion of one frame member and the other leg being located within the end portion of the other frame members, and each leg having a detent to form a retaining means, and the end portion of each frame member having a locking surface located a spaced distance from the corner end of the frame member, the detent on each leg located in opposition to and bearing against the locking surface on the frame member associated with each leg, whereby the frame members are locked in engagement with the legs and separation of the corner ends of adjacent frame members is prevented.

Also in accordance with the present invention, there is provided a novel attachment means between the spacer frame in a sealed multiple-pane window and the original window frame, the attachment means comprising a substantially rigid link between the outwardly facing surface of the spacer frame and the inwardly facing surface of the original window frame, the attachment means being located intermediate the corners of the spacer frame, whereby the spacer frame is maintained at a predetermined distance from the original window frame to prevent flexing of the spacer frame members when they are subjected to forces created by pressure differentials between the ambient atmosphere and the atmosphere inside the cavity between the panes.

In addition, in accordance with the present invention, there is provided a method of forming sealed, multiple-pane windows on site utilizing the original pane of glass including heating the unit components to cause the sealant between the panes and the spacer frame to adhere better and completing final sealing of the unit after the temperature of the window components and the air within the cavity are substantially the same as the ambient temperature, whereby upon final sealing of the unit the density of the air within the cavity is substantially the same as the density of the ambient air so that a partial vacuum is not formed within the cavity upon sealing the window and the window components having cooled down.

BRIEF DESCRIPTION OF THE DRAWINGS

While the specification concludes with claims particularly pointing out and distinctly claiming the subject matter which is regarded as forming the present invention, it is believed that the invention will be better understood from the following description in connection with the accompanying drawings, in which the thickness of some of the materials are exaggerated for clarity and in which:

FIG. 3 is a fragmentary perspective view of one corner of a finished installed window of this invention within a window frame;

FIGS. 7, 8 and 9 are cross sectional views of alternate spacer frame corner constructions of this invention.

DETAILED DESCRIPTION OF THE INVENTION

Figure 1:
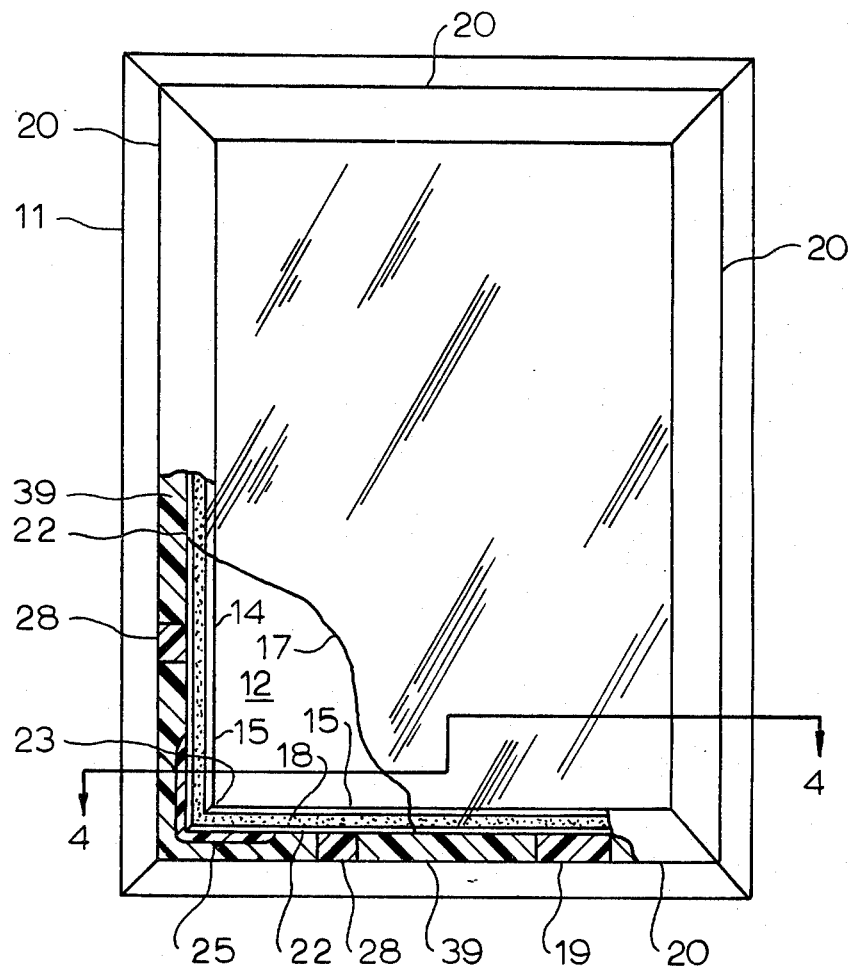
FIG. 1 is a fragmentary elevational view of a sealed, multiple pane window of this invention.

The assembly of a glazing unit according to the present invention to an existing window is shown in FIGS. 1 and 3. Said window consists of a window frame 11 and an original glass pane 12. The original glass pane is fastened to the window frame by suitable means 13, such as a glazing bead.

A spacer frame 14, made of spacer frame members 15, is attached and sealed to the original glass pane 12 by an adhesive sealant 16. The outside dimensions of spacer frame 14 are slightly less than the inside dimensions of the window frame 11 so that the spacer frame 14 fits inside the window frame 11. It has been found that the gap between the spacer frame 14 and the window frame 11 should be in the range of ⅛ inch to ⅜ inch, perferably ¼ inch, around the entire periphery of spacer frame 14. Adhesive sealant 16 is a continuous ribbon in the interface between the original glass pane 12 and the spacer frame 14.

A second glass pane 17 is attached and sealed to a second surface of the spacer frame 14 by means of a second adhesive sealant 18. The second surface of the spacer frame is diametrically opposite the surface of the spacer frame 14 which interfaces with the original glass pane 12. The adhesive sealant 18 is a continuous ribbon in the interface between the spacer frame 14 and the second glass pane 17. The dimensions of the outer periphery of the second glass pane 17 are perferably about the same as the dimensions of the outer periphery of the spacer frame.

The spacer frame 14 and the second glass pane 17 are spaced from the window frame by rubber shear blocks 19 the use of which is well known in the glazing industry. The shear blocks 19 support the spacer frame 14 and the second glass pane 17 during installation. The shear blocks 19 used on the sill of window frame 11 also provide support to and prevent the second glass pane 17 and the spacer frame 14 from shearing downwardly after installation of the second glass pane. Use of shear blocks 19 around the balance of the window periphery is preferable but optional.

If desired, trim pieces 20 can be applied to the outside surfaces of the original glass pane 12 and the second glass pane 17 around the outer periphery of the original glass pane 12 and second glass pane 17 to conceal the spacer frame 14 and the adhesive sealant 16 and 18 and outside seal 39. The trim pieces 20 are attached to the outer surfaces of the original glass pane 12 and the second glass pane 17 but may alternatively be attached to the window frame 11 with appropriate attachment means (not shown).

Figure 6:
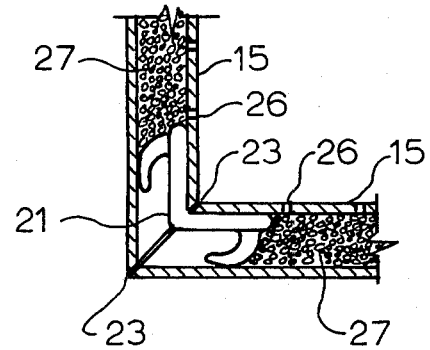
FIG. 6 is a cross-sectional view of one embodiment of a corner of a spacer frame of this invention taken along line 6—6 of FIG. 4.

The spacer frame 14 is formed by cutting appropriate lengths of tubular material to form spacer frame members 15. The tubular material generally used is aluminum. The spacer frame members may be mitered at their ends so the spacer frame members when assembled form the desired peripheral profile. A corner key 21, having two legs which are oriented with respect to each other to provide the desired corner profile, is inserted into the ends of adjacent spacer frame members 15 to form a corner of the spacer frame such as shown in FIG. 6. The dimensions of each leg of the corner keys used are such to form a snug fit between the leg and diametrically opposite inside surfaces of ends of the spacer frame members 15. The corner keys may be formed of metal, for example, aluminum, or plastic, for example, nylon.

The outside surface 22 of spacer frame members 15 is preferably non perforate. The outside surface 22 is preferably non perforate because it is desirable to form a hermetic seal about the cavity 24 which is created between the original glass pane 12 and the second glass pane 17. The spacer frame 14 helps provide such a seal.

Figure 2:
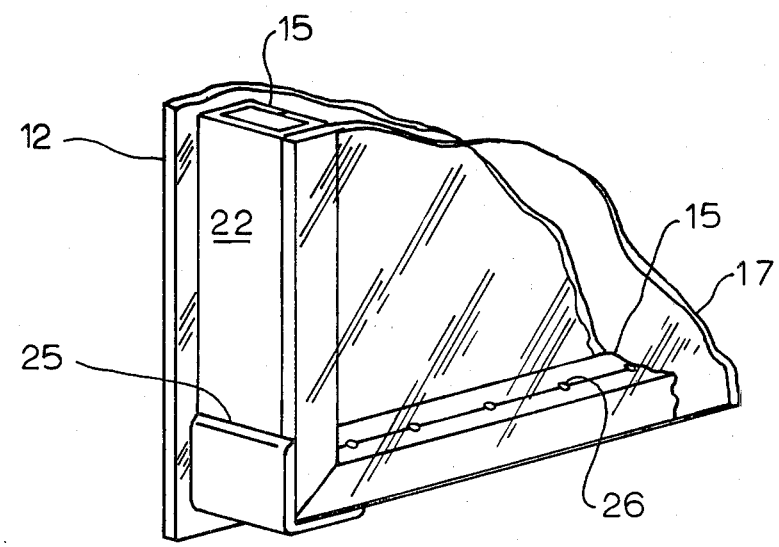
FIG. 2 is a fragmentary perspective view of one corner of a sealed window of this invention.

An air passageway 23 is provided between adjacent spacer frame members in at least one corner of the spacer frame 14 to allow air to flow into and out of the cavity 24 until the final seal is applied to the cavity. An air passageway could also be provided through or around the spacer frame 14 in another location if desired, such as a hole thru the outside surface 22 of a spacer frame member 15 intermediate the ends of one of the spacer frame members. An air passageway seal 25 is applied over the outside opening of each air passageway 23. This seal 25 is preferable a flexible resiliant sealant and covers the entire outside opening of the air passageway and a significant area of the outside surface 22 of the spacer frame member 15 surrounding the outside opening of the air passageway 23 such as shown in FIG. 2. The seal 25, if applied to a corner of the spacer frame 14, extends from the original glass pane 12 to the second glass pane 17 and is adhered to both said panes in addition to being adhered to the outside surface 22 of the spacer frame 14. The seal 25 may flow inside the outer wall of spacer frame members 15 through air passageway 23 but not to any significant extent.

Spacer frame members 15 are provided with a plurality of holes 26 through the inside wall of said members. The holes 26 are provided so that air can circulate between the cavity 24 and the interior of the hollow spacer frame members 15. The interior of one or more hollow spacer frame members 15 is filled with desiccant 27. Desiccant 27 attracts and retains moisture from the air within cavity 24.

The spacer frame 14 is attached to the window frame 11 by a spacer frame stabilizing means 28 at a plurality of locations around the periphery of the spacer frame 14. The spacer frame stabilizing means 28 are located intermediate the ends of the spacer frame members 15. After assembly, the spacers frame members 15 may be subjected to forces resulting from pressure differentials between the cavity atmosphere and the ambient atmosphere. Such forces tend to deflect the spacer frame members 15 inward or outward depending on whether the pressure within the cavity 24 is less than or greater than the ambient pressure. Such movement of the spacer frame members 15 is undesireable because the movement spreads and deposits adhesive sealant 16 and 18 on the "sight" portion of interior surfaces of the glass panes 12 and 17 and the movement disturbs the adhesive sealant 16 and 18 and may cause a failure of the seal provided by adhesive sealant 16 and 18. The spacer frame stabilizing means 28 acts to substantially prevent movement, both inwardly and outwardly with respect to cavity 24, of the spacer frame members 15.

The spacer frame stabilizing means 28 are placed intermediate the ends of spacer frame members 15 because the centers of the spacer frame members 15 tend to experience the greatest movement. For example, a spacer frame stabilizing means 28 located midway along the length of or at each quarter point along the length of each spacer frame member 15 would provide the required stabilization, assuming that adjacent spacer frame members are attached to each other at the corners. Movement of the spacer frame members 15 also tends to create gaps in the corners between adjacent spacer frame members. Such gaps can create a failure in the seal around the cavity 24, thereby allowing ambient moist air into the cavity 24.

The spacer frame stabilizing means 28 can be a semi-rigid adhesive which bonds well to metals, paints and porous surfaces and which is substantially inelastic when set or cured, such as some hot melt glues or thermoplastic or thermoset resins. Such a spacer frame stabilizing means is heated and flowed into the gap between the window frame 11 and the spacer frame member 15, filling the gap and bonding to both the inside surface of the window frame 11 and the outside surface 22 of the spacer frame members 15 and the gap-facing surface of glass pane 12, such as is shown in FIG. 1. A semi-rigid adhesive such as a hot melt polyethylene adhesive has been used with success having a length of at least 1/4 inch, and preferably 1/2 inch, as measured along the spacer frame. And it has been found that such a stabilizing means elongates no more than 1/32 inch under 3 pounds tensile force.

An alternate spacer frame stabilizer means (not shown) is a rigid metal bracket which is securely fastened to both the inside surface of the window frame 11 and the outside surface 22 of the spacer frame members 15.

Figure 5:
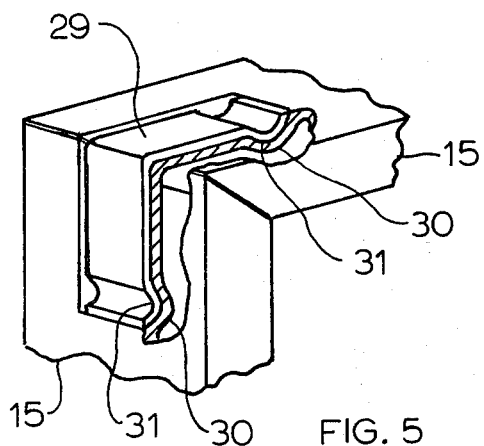
FIG. 5 is a fragmentary perspective view of one embodiment of a corner of a spacer frame of this invention.

This invention also includes locking the corners of the spacer frame 14 as shown in FIGS. 5, 7, 8 and 9. The adjacent ends of spacer frame members 15 forming corners are locked to prevent separation of the adjacent ends. FIG. 5 shows a spring clip 29 formed to extend around the corner. Each spacer frame member 15 has a depression 30, which provides an abutment formed in the outside wall 22 a short distance from the corner end. The spring clip 29 has a lip 31 formed on the distal end of each leg to provide a detent. The lip seats in the depression 30, thereby holding together the adjacent ends of the spacer frame members 15 to maintain a tight corner. The depression 30 and the lip 31, together with the spring action of spring clip 29, act to draw the ends of the spacer frame members 15 closer together.

Figure 7:
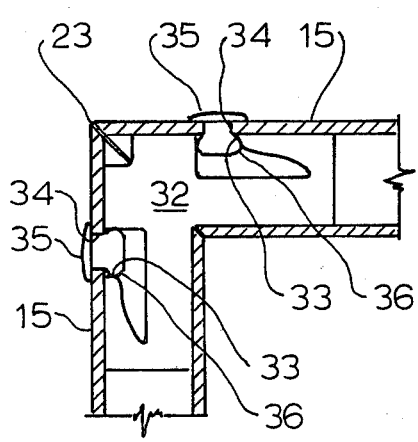

An alternate locking mechanism at the corner of the spacer frame 14 is shown in FIG. 7. A corner key 32, having two legs, is inserted into adjacent ends of spacer frame members 15, one leg in one spacer frame member and the other leg in the other spacer frame member. Each leg has a retaining surface 33, to provide a detent, facing the corner and located adjacent the outer wall 22 of the spacer frame member 15. A hole 34 is provided through outer wall 22 of the spacer frame member 15, with the hole 34 being adjacent the retaining surface 33 of the corner key 32. A sheet metal fastener, such as an expanding rivet 35, is inserted through hole 34 and set. The rivet provides an abutment on the spacer frame member. It has been found that a commonly available "pop" rivet having a 1/8 inch original diameter works well in this application. The "pop" rivet can be set from outside the spacer frame member. The expanded portion of the rivet 35 contacts and bears against the retaining surface 33, thereby locking the corner key 32 in position within the spacer frame member and preventing separation thereof. The expanded portion of rivet 35 provides a locking surface attached to the frame members 15.

A sheet metal screw can alternatively be used as the fastener which extends through the hole and into the interior of the spacer frame member. Such a sheet metal screw becomes fastened to the wall of frame member 15 when screwed into the hole, by the screw threads which engage the sides of the hole and/or the interior surface of the wall surrounding the hole.

In addition, a seal gasket 101 can be placed beneath the head of the fastener, and the seal gasket is compressed between the head of the fastener and outside surface 22 of the spacer frame member. Of course the diameter of the gasket would be larger than the diameter of the hole so as to seal the hole when the fastener is attached to the wall of the spacer frame.

The retaining surface 33 can be formed by a hole in or through the leg of the corner key 32 or by a transverse slot cut in the leg of the corner key 32 or by the leading edge of a corner-facing, resilient tang formed on the leg of corner key 32. If a hole is formed through the outer wall 22 of the spacer frame member 15 for insertion of rivet 35, the air passageway seal 25 should preferably be extended to cover the outside surface of rivet 35 and the surrounding outer surface of outer wall 22 or a separate similar seal should be applied over the outside surface of rivet 35 and the surrounding surface of outer wall 22. Although the rivet expands and contacts the edge of the hole to provide a low pressure seal, a secondary seal is desireable to prevent ambient air from permeating into the cavity 24.

FIGS. 8 and 9 show other alternate embodiments of locking corner keys. One or more holes or dimples are formed in the walls of the spacer frame member 15 to provide an abutment. One edge of such a hole or dimple provides a locking surface 36, sometimes referred to herein as an abutment, on frame member 15. The corner key 42 or 52 has a tang or detent 37 normally protruding beyond the inside surface of the wall of the frame member, said wall carrying the locking surface 36 and being intended to cooperate with the detent 37. Detent 37 is dimensioned to fit within the hole or dimple provided in the spacer frame member 15. Preferably detent 37 is normally biased toward the wall of the spacer frame member 15 with which it is intended to cooperate, such as by a flexible, resilient member 38 which is shown as a cantilever arm and as a part of the leg which extends from the distal portion of the leg of the corner key. Such cantilever arm can be curvilinear as shown in FIG. 8. With the corner key in its proper position within the spacer frame member, the detent 37 is aligned with the hole or dimple in the wall of the spacer frame member. The detent 37 is biased into the hole or dimple and contacts and bears against the locking surface 36, thereby locking the spacer frame member 15 in position with respect to the corner key and prevents separation of adjacent spacer frame members at the corner. In FIG. 8 the locking surface 36 is shown in the wall of the spacer frame member facing the cavity. Of course, the locking surface 36 could also be placed in the wall of the spacer frame member which faces the window frame 11. In FIG. 9 the locking surface 36 is shown in both of the side walls of the spacer frame member, that is, the walls which face the glass panes 12 and 17.

Figure 4:
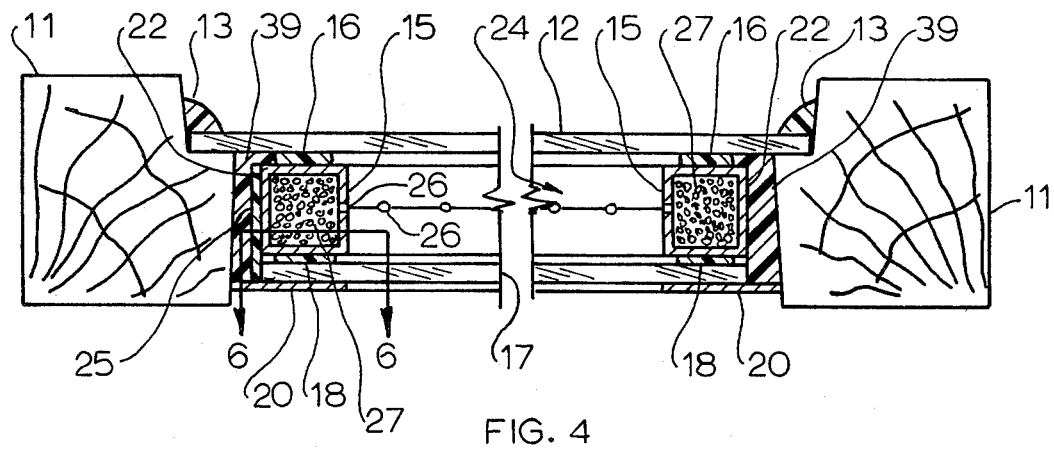
FIG. 4 is a cross-sectional plan view of a sealed window of this invention within a window frame taken along line 4—4 of FIG. 1.

Another feature of this invention is the addition of a secondary or outside seal 39, as partially shown in FIGS. 3 and 4. The outside seal 39 is applied substantially around the entire periphery of the sealed unit. Various sealants, such as polyisobutylene and polysulfates, have been found to perform well as the outside seal. The outside seal 39 substantially fills the available gap between the spacer frame 14 and the window frame 11. It is adhered to the surface of the original glass pane 12, covers and adheres to the outside surface 22 of the spacer frame 14 and the air passageway seal 25, and covers and adheres to the peripheral edge of the second glass pane 17. The outside seal 39 provides support and cushioning for the spacer frame 14 and the second glass pane 17 as well as providing a secondary seal for the cavity.

Figure 10:
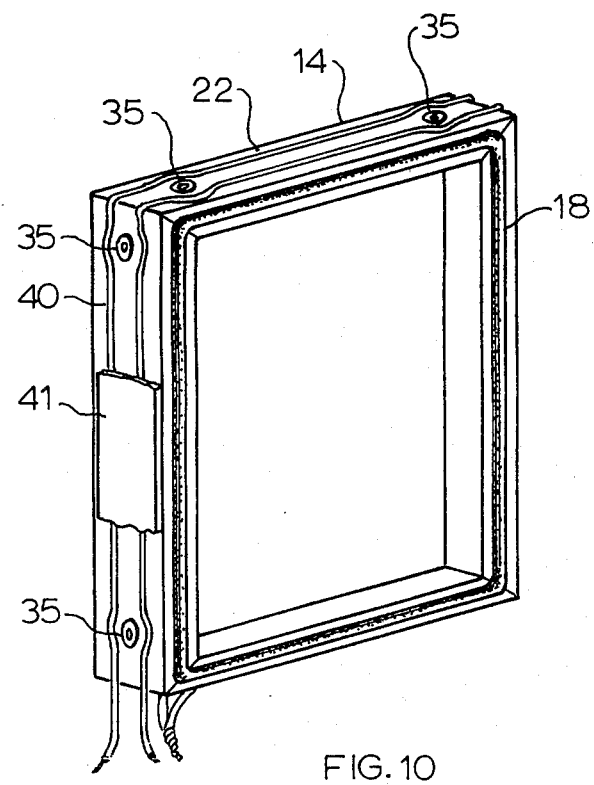
FIG. 10 is a perspective view of the spacer frame of this invention.

FIG. 10 shows the subassembly of the spacer frame 14 ready for insertion within the window frame 11 and against the original glass pane 12. Spacer frame members 15 are prepared before assembly with beads of adhesive sealant 16 and 18 laid along the side surfaces which will face the original glass pane 12 and the second glass pane 17. The spacer frame members 15 are then assembled into spacer frame 14 with corner keys in the corners and rivets 35 or other corner locking means as previously described. The adhesive sealant 16 and 18 is a thermoplastic material which flows and bonds upon heating. Therefore heating of the adhesive sealant 16 and 18 is desireable after the spacer frame 14 is sandwiched between the original glass pane 12 and the second glass pane 17. The adhesive sealant 16 and 18 can be heated via a continuous electrical resistance wire 40 which is placed in contact with spacer frame 14 along substantially the entire length of the outside surface 22 of the spacer frame 14. A means for keeping the wire in contact with the outside surface 22 of the spacer frame 14, such as a pressure sensitive tape 41, is used to insure good heat transfer between the wire 40 and the spacer frame 14. The tape 41 is laid over the wire 40 and adhered to the outside surface 22. It is preferable that the tape 41 is heat resistant to withstand the temperature of the wire and the spacer frame 14 during heating, which temperature can be in the range of 180° F. to 220° F. But other readily available tapes, such as fiberglass reinforced banding tape and masking tape, have been used with success.

The wire 40 is placed on the outside surface 22 in order to obtain substantially equal heat distribution through the spacer frame 14 to both adhesive sealants 16 and 18 and still be accessible for removal after the heating process is completed. The wire 40 can be removed after the heating process by merely stripping the tape 41 from the outside surface 22. The wire 40 has a thin coating of insulation which does not degrade under the temperatures experienced so that the wire does not short out to the spacer frame 14.

A sealed multiple-pane window in accordance with the present invention can be installed as follows. A bead of adhesive sealant is applied to both side faces of tubular material to be used for the spacer frame 14. Silicone treated release paper may be applied to cover and protect the bead of adhesive sealant until the spacer frame 14 is installed. The tubular material is then cut to discrete lengths to form spacer frame members 15. The spacer frame members should be about ½ inch shorter than the corresponding inside dimension of the window frame 11. The ends of the spacer frame members 15 are preferably cut at a mitered angle but could alternatively have a butt cut if corner keys for a butt cut are to be used. The holes or dimples for a locked corner are then formed in the proper location near each end of the spacer frame members.

The spacer frame members 15 are then assembled to form the spacer frame 14. One leg of a corner key is inserted into the tubular end of one spacer frame member and the other leg is inserted into the end of another spacer frame member. The two spacer frame members are pushed onto the legs as far as they will go to form a corner wherein the ends of the spacer frame members are abuting to form a corner without any apparent gap but providing an air passageway 23 between the ends of the adjacent spacer frame members. If a riveted locked corner is used, the rivets are then inserted into the properly formed holes in each spacer frame member and set to lock the corner key within the ends of the spacer frame members. If the "snaplock" corner keys are used, the detents on the corner key register in the mating holes or dimples in the spacer frame members upon pushing the corner keys into position and contact and bear against the locking surface on the spacer frame members.

Each spacer frame member wherein desiccant is desired is filled with desiccant before a corner key is inserted into the second end of the spacer frame member. The balance of the spacer frame corners are completed as described above.

Upon completion of formation of the spacer frame, continuity of the bead of adhesive sealant 16 and 18 at each corner is checked. If the bead of adhesive sealant is not continuous across the interface between adjacent spacer frame members, a small amount of adhesive sealant is applied at each corner to bridge any gap and to insure continuity of the adhesive sealant 16 and 18 from one spacer frame member to the adjacent spacer frame member.

The electrical resistance heating wire 40 is then stretched around the outer periphery of the spacer frame 14 in contact with outside surface 22. The pressure sensitive tape 41 is then applied over the wire 40 and adhered to outside surface 22 to maintain the wire 40 in contact with outside surface 22. Attachment lead ends of the wire are provided at each end of the wire for later connection to an electrical source. The attachment leads are preferably 6 to 12 inches long and are preferably located at one of the lower corners of the spacer frame 14. An alternate method of applying the wire 40 is to first lay the wire 40 on the pressure sensitive tape 41. Then the tape and wire combination can be applied to outside surface 22 of spacer frame 14. It has been found that the wire 40 is more easily controlled and applied if it is first combined with the tape 41.

The second glass pane 17 is cut to the proper dimensions, which dimensions are substantially the same as the outside dimensions for the spacer frame 14. The cavity-facing surfaces of the original glass pane 12 and the second glass pane 17 are cleaned and polished with a good grade glass cleaner.

The lower shear blocks 19 are placed on the window sill and in contact with the original glass pane 12. The shear blocks should have a depth sufficient to support both the spacer frame 14 and the second glass pane 17. At least two shear blocks 19 should be placed on the window sill, preferably at the ⅓ and ⅔ locations along the sill. More shear blocks may be used if desired. The silicone release paper covering the adhesive sealant 16 is removed and the spacer frame 14 is then placed on the shear blocks 19 and positioned centrally within the window frame 11. It is pressed slightly against the original glass pane 12 and the tacky nature of adhesive sealant 16 retains the spacer 14 against pane 12. The silicone release paper covering adhesive sealant 18 is removed.

The second glass pane 17 is placed on shear blocks 19 and positioned centrally within the window frame 11 and aligned with the spacer frame 14. It is pressed slightly against the spacer frame 14 and the tacky nature of adhesive sealant 18 retains pane 17 against spacer frame 14. But it is good practice to provide additional support for pane 17 until adhesive sealants 16 and 18 are heated and the bonds created thereby are secure.

The attachment leads for wire 40 are extended outside the plane of pane 17 and attached to an electrical source to heat the wire 40, which heats spacer frame 14, which in turn heats adhesive sealant 16 and 18. The electrical source is applied through a variable transformer and for a period of time until the adhesive sealant is heated to a temperature of approximately 170° F. to 180° F., which temperature is considered appropriate to provide proper spreading of the bead of adhesive sealant and bonding to the glass panes and spacer frame. The heating time required varies in accordance with the size of the window and the ambient temperature. Five to 15 minutes of heating is usually sufficient. It can be visually determined when the adhesive sealant is hot enough by pressing inwardly on pane 17 and observing whether the bead of adhesive sealant 18 flows under moderate pressure to cover the entire width of the visable side surface of the spacer frame 14.

Upon the adhesive sealant reaching the proper temperature, pressure is applied to the face of pane 17 around its entire periphery to properly spread adhesive sealant 16 and 18 over the side faces of spacer frame 14. Adhesive sealant 16 and 18 is properly spread when it has flowed to cover substantially the entire width of the side faces of spacer frame 14. The electrical source is then disconnected and the spacer frame 14, adhesive sealant 16 and 18 and panes 12 and 17 are allowed to cool down to ambient temperature. The wire 40 and tape 41 may be removed at this time by stripping the tape 41 from outside surface 22.

The spacer frame stabilizing means 28 can then be installed. A hot melt adhesive, which has been found to work well, is injected into and substantially fills the gap between outside surface 22 of spacer frame 14 and the inside surface of window frame 11. The hot melt adhesive is injected at one or more locations along each spacer frame member 15 intermediate the ends thereof. The hot melt adhesive sets up in a short time.

After the panes, adhesive sealant and spacer frame have cooled down, the air passageway seals 25 are applied by flowing the seal material over and around any and all openings in outside surface 22 which lead to air passageways 23, and which could otherwise allow communication between the ambient atmosphere and the cavity 24.

The shear blocks 19 are cut off even with the plane of the outside surface of the second glass pane 17 if they extend beyond that plane.

The outside seal 39 is then applied as a continuous layer over the entire periphery of the combination of the outside surface 22 of the spacer frame 14, the air passageway seals 25, the exposed surface of the original glass pane 12 in the gap between the spacer frame 14 and the window frame 11, and the lateral edges of the second glass pane 17. Outside seal 39 preferably fills the entire gap between the inside surface of the window frame 11 and the combination of the outside surface 22 of spacer frame 14 and the lateral edges of the second glass pane 17. Outside seal 39 is a material which is substantially impervious to the transmission of air and water vapor. It has been found that polyisobutylene materials have performed well as outside seal 39. Silicone rubber caulk materials have also been used. They can be applied as a flowable material to penetrate into gaps and crevices. They adhere well to glass, wood, paint, metal and other materials, and they cure to form a solid resiliant seal.

Trim pieces 20 are then applied, if desired, around the periphery of the sealed unit. The trim pieces 20 are preferably of a width to conceal both the outside seal 39 and the spacer frame 14, that is, having a width extending from the inside surface of window frame 11 to the plane of the inside surface of spacer frame 14. The trim pieces 20 can be strips of aluminum or wood adhesively secured to the outside surfaces of panes 12 and 17 and-/or the inside surface of window frame 11.

After final cleanup of fingerprints, excess sealants and other foreign materials from the exposed surfaces, the installation is complete.

Specific identifications of materials and sources of materials which can be used in practicing this invention are as follows. The spacer frame material is lazer welded rectangular tubular air spacers for insulating glass available from Allmetal, Inc., Bensenville, Il. The adhesive sealant 16 and 18 used is polyisobutylene insulating glass sealant, JS-780 available from Tremco, Inc., Cleveland, Ohio. The shear blocks are rubber setting blocks available from C. R. Laurence Co., Inc., Los Angeles, Ca. The corner keys are molded nylon insulating glass corner inserts available from Allmetal, Inc., Bensenville, Il. The outside seal 39 is silicone rubber sealant available from Dow Corning Corp, Midland, Mich. or as RTV from General Electric Co., Waterford, NY or as Chem-Calk 1200 from Woodmont Products, Inc., Huntington Valley, Pa. The air passageway seal 25 is either the polyisobutylene or silicone rubber sealant mentioned above. The spacer frame stabilizing means 28 is a polyethylene based adhesive available from MR Corporation, Bostik Division, Middleton, Mass. and identified as #6330 thermogrip Hot Melt. The desiccant 27 is a sodium silico aluminate available from W. R. Grace, Davison Chemical Division, Baltimore, MD and identified as 801LD, low deflection grade adsorbent for insulating glass. The rivets 35 are aluminum rivets available from USM Corp., Fastener Division, Shelton, CT and identified as AD-41-H pop rivets. The electrical resistance heating wire is 25 gauge aluminum magnet resistance wire available from Essex Corp, Fort Wayne, Ind. The pressure sensitive tape 41 is reinforced banding tape available from Permacel, New Brunswick, NJ or Scotch Brand Electrical Tape No. 69, glass cloth, thermosetting silicone pressure sensitive adhesive available from 3M Company, St. Paul, Minn. Other alternative materials can be used in practicing this invention.

Thus it is apparent that there has been provided, in accordance with the invention, a multiple-pane, hermetically-sealed, thermal-resistant window and method of installing same that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations which fall within the spirit and broad scope of the appended claims.

What is claimed is:

1. A corner construction for joining and maintaining adjacent tubular frame members in juxtaposition to form a corner in a frame, said corner construction comprising:

A. two tubular frame members arranged to form the desired frame profile at a corner of the frame, one end of one frame member being adjacent and juxtaposed to one end of the other frame member;

B. an aperture located in and through a wall of each frame member, each aperture being spaced a distance from the corner end of the frame member;

C. an abutment member having an outer portion comprising a first head and an intermediate portion comprising a shank and an inner portion comprising a second head, the shank being positioned within the confines of the aperture, the first head being located outside of the outside surface of said wall of the tubular frame member, the second head being located inside of the inside surface of said wall of the tubular frame member;

D. the diameter of the first head being greater than the diameter of the aperture, so that a portion of the outside surface of the wall of the tubular frame member subtends an annulus of the first head, said first head annulus being continuous around the aperture and in surface-to-surface contact with the outside surface of said wall of the tubular frame around the aperture;

E. the diameter of the second head being greater than the diameter of the aperture so that a portion of the inside surface of the wall of the tubular frame member subtends an annulus of the second head, said second head annulus being continuous around the aperture and in surface-to-surface contact with the inside surface of said wall of the tubular frame around the aperture, whereby the abutment member extends across and substantially seals both the outside opening to the aperture and the inside opening to the aperture;

F. a detent bearing against the distal surface of the second head on each frame member, the distal surface being the surface located furthermost from the corresponding corner of the frame; and G. a rigid connecting member extending from the detent acting on one frame member to the detent acting on the other frame member, whereby each detent bearing on the second head of its corresponding abutment member holds one frame member in juxtaposition with respect to the other frame member.

* * * * *